(12) United States Patent
Narula et al.

(10) Patent No.: US 10,527,117 B2
(45) Date of Patent: Jan. 7, 2020

(54) MODULE

(71) Applicant: Meritor Heavy Vehicle Braking Systems (UK) Limited, Cwmbran, Gwent (GB)

(72) Inventors: Prashant Narula, Gwent (GB); Brian Wiggins, Gwent (GB); Dietmar Knoop, Ebenhausen (DE)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 484 days.

(21) Appl. No.: 14/853,101

(22) Filed: Sep. 14, 2015

(65) Prior Publication Data

US 2016/0076614 A1 Mar. 17, 2016

(30) Foreign Application Priority Data

Sep. 15, 2014 (EP) ..................... 14184721

(51) Int. Cl.
| | | |
|---|---|---|
| *F16D 65/18* | (2006.01) | |
| *H02K 5/22* | (2006.01) | |
| *F16H 1/28* | (2006.01) | |
| *F16D 65/56* | (2006.01) | |
| *F16D 55/2255* | (2006.01) | |

(Continued)

(52) U.S. Cl.
CPC ......... *F16D 65/18* (2013.01); *F16D 55/2255* (2013.01); *F16D 65/568* (2013.01); *F16H 1/28* (2013.01); *H02K 5/225* (2013.01); *F16D 2065/386* (2013.01); *F16D 2066/003* (2013.01);

(Continued)

(58) Field of Classification Search
CPC .... F16D 65/568; F16D 65/18; F16D 2121/24; F16D 55/2255; F16D 2121/08; F16D 2065/386; F16D 2066/003; F16D 2125/50; F16H 1/28; H02K 5/225

See application file for complete search history.

(56) References Cited

U.S. PATENT DOCUMENTS 5,348,123 A * 9/1994 Takahashi ................. B60T 7/04
188/72.1
5,848,672 A * 12/1998 Brearley ................. F16D 65/18
188/1.11 L (Continued)

FOREIGN PATENT DOCUMENTS

DE 102009060203 A1 6/2011
EP 0877872 A1 11/1998

(Continued)

OTHER PUBLICATIONS

European Patent Office, Extended Search Report for the corresponding European Patent Application EP 14184721.0 dated Mar. 5, 2015.

(Continued)

*Primary Examiner* — Xuan Lan Nguyen
(74) *Attorney, Agent, or Firm* — Brooks Kushman P.C.

(57) ABSTRACT

A module including a module housing enclosing an electric motor, an output element mounted externally of the module housing, the output element being operably coupled to the electric motor and the module housing including an electrical interface for electrically coupling the motor to one or more components mounted externally of the module housing.

12 Claims, 2 Drawing Sheets

(51) Int. Cl.
   *F16D 121/24*    (2012.01)
   *F16D 125/50*    (2012.01)
   *F16D 66/00*     (2006.01)
   *F16D 65/38*     (2006.01)
   *F16D 121/08*    (2012.01)

(52) U.S. Cl.
   CPC ...... *F16D 2121/08* (2013.01); *F16D 2121/24* (2013.01); *F16D 2125/50* (2013.01)

(56) References Cited

U.S. PATENT DOCUMENTS

| | | | |
|---|---|---|---|
| 6,234,587 B1 * | 5/2001 | Gerum | B60T 8/327 188/1.11 W |
| 6,293,370 B1 * | 9/2001 | McCann | B60T 1/065 188/1.11 E |
| 6,305,508 B1 * | 10/2001 | Schumann | B60T 13/741 188/72.8 |
| 6,837,342 B1 * | 1/2005 | Olschewski | F16D 55/228 188/72.5 |
| 8,070,238 B2 * | 12/2011 | Yasukawa | B60T 13/02 303/20 |
| 8,292,042 B2 * | 10/2012 | Kim | F16D 65/18 188/162 |
| 8,453,803 B2 * | 6/2013 | Cho | B60T 8/326 188/156 |
| 2002/0020591 A1 * | 2/2002 | Schanzenbach | B60T 13/745 188/158 |
| 2005/0103583 A1 | 5/2005 | Baumgartner et al. | |
| 2005/0241894 A1 * | 11/2005 | Baumgartner | F16D 65/567 188/79.51 |
| 2005/0252738 A1 | 11/2005 | Baumgartner et al. | |
| 2011/0316374 A1 | 12/2011 | Miyaji et al. | |
| 2013/0062148 A1 * | 3/2013 | Park | B60T 13/741 188/72.1 |
| 2013/0180811 A1 * | 7/2013 | Poertzgen | B60T 13/741 188/156 |

FOREIGN PATENT DOCUMENTS

| | | |
|---|---|---|
| EP | 2650556 A1 | 10/2013 |
| JP | H09215261 A | 8/1997 |

OTHER PUBLICATIONS

European Patent Office, Examination Report for corresponding European Application No. 14184721.0, dated Jan. 25, 2019.

* cited by examiner

MODULE

TECHNICAL FIELD

The present invention relates to a module in particular for a brake.

BACKGROUND

Brake pads and brake shoes include friction material which progressively wears away as the brake is used. Electromechanical wear sensors are known which can determine the amount of friction material wear and provide an indication to an operator that the brake pads or shoes require replacement. EP0877872 shows a sensor which monitors the movement of a brake component which moves in proportion to brake pad wear. The sensor outputs an electrical signal indicative of an amount of brake pad wear. Such a system relies on the progressive movement of the internal brake mechanism.

EP2650556 shows a brake assembly which is air actuated and has an adjuster driven by an electric motor.

SUMMARY

According to a first aspect of the present invention there is provided a module including a module housing enclosing an electric motor, an output element mounted externally of the module housing, the output element being operably coupled to the electric motor and the module housing including an electrical interface for electrically coupling the motor to one or more components mounted externally of the module housing.

The electric motor may be rotatable about a first axis and the output element may be mounted on a shaft rotatable about a second axis different from the first axis, at least a part of the shaft may be received in the module housing.

The motor may drive a first gear rotatable about the first axis, the first gear may be in meshing engagement with a second gear rotatable about the second axis, the first and second gears may be contained within the module housing.

The first gear may rotate faster than the second gear.

The output element may be operably coupled to the electric motor by a planetary gear box having a sun gear, at least one planet gear, and a ring gear.

An axis of rotation of the sun gear may be coincident with the second axis.

In use, the sun gear may rotate at the same speed as the second gear.

At least one planet gear may be mounted on a planet carrier and, in use, the planet carrier may rotate at the same speed as the output element.

The electrical interface may include at least a first electrical connector and a second electrical connector distinct from the first electrical connector.

The module housing may be a sealed housing.

The module housing may include a body and a cover for closing an opening of the body and preferably the motor may be enclosed within the body.

The module housing may include a body and a cover for closing an opening of the body and preferably the planetary gear box may be enclosed within the body.

The body may be a two part body.

The first and second gears may be positioned in a cavity defined between the body and the cover.

The module housing may enclose an integrated electronic unit, the integrated electronic unit may include one or more of:
 a PCB,
 a processor, preferably a microprocessor,
 memory,
 a motor driver,
 a CAN transmitter,
 a CAN reader.

The output element may be positioned on a first side of the first and second gears and the integrated electronic unit may be positioned on a second side of the first and second gears opposite the first side, and/or the output element may be positioned on a first side of the planetary gear box and the integrated electronic unit may be positioned on a second side of the planetary gear box opposite the first side, and/or the integrated electronic unit may be at least partially received in a recess of the cover.

According to a second aspect of the present invention there is provided a brake assembly including a brake housing, an adjuster mechanism received within the brake housing and a module as defined in the first aspect of the present invention, the module being at least partially received in the brake housing and being operable to adjust the adjuster mechanism.

The output element may be received within the brake housing.

The electrical interface may be received within the brake housing.

The first electrical connection may be received within the brake housing and the second electrical connector may be mounted externally of the brake housing.

The brake assembly may include a sensor received within the brake housing and may be electrically coupled to the first electrical connector.

The module housing may be sealed to the brake housing.

The brake housing may include an aperture for receiving at least a part of the module housing, an edge of the aperture may be sealed to an adjacent part of the module housing.

The adjacent part of the module housing may be defined by the body.

The body may be directly secured to the brake housing.

The cover may be mounted externally relative to the brake housing.

A part of the integrated electronic unit may be mounted externally relative to the brake housing.

The cover may be sealed to the body.

According to a further aspect of the present invention there is provided a method of assembling a brake assembly including:
 a) providing a brake housing,
 b) providing an operating mechanism,
 c) assembling the operating mechanism into the brake housing,
 d) separately providing a module as defined in the first aspect of the present invention,
 e) assembling the module with the brake housing such that the module is at least partially received within the brake housing.

Step e) may include operably coupling the output element with a brake adjuster mechanism.

Step e) may include electrically coupling the motor to one or more components mounted externally of the module housing.

Step e) may include sealing the module housing to the brake housing.

Advantageously the invention provides for a module for adjusting the brake which can be readily maintained.

BRIEF DESCRIPTION OF THE DRAWINGS

The invention will now be described followed by way of example only, with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
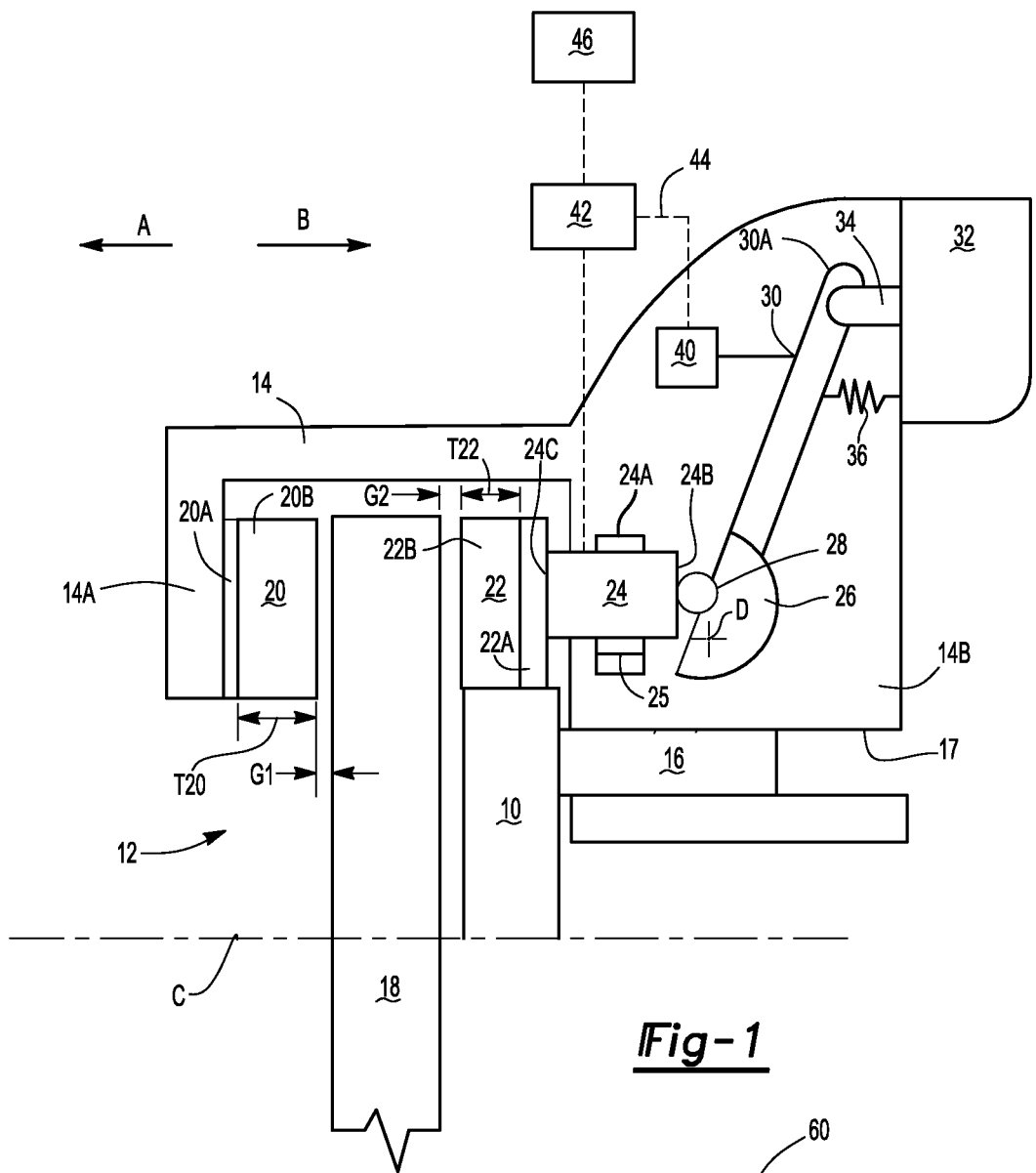
FIG. 1 shows a schematic view of a brake according to the present invention.
Figure 2:
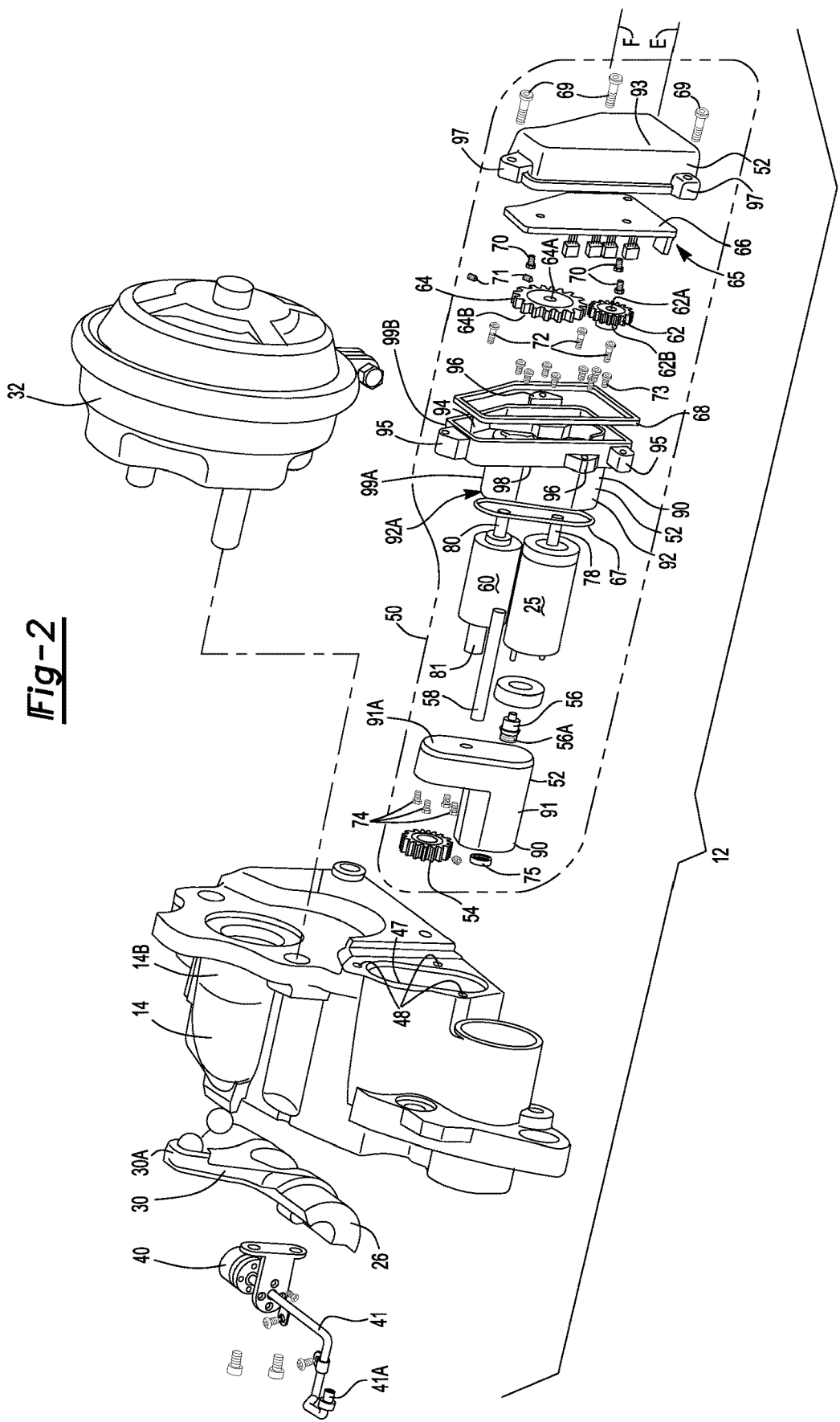
FIG. 2 shows an exploded view of brake according to the present invention including the module according to the present invention.

With reference to FIGS. 1 and 2 there is shown a vehicle 10 having a brake 12. The brake 12 includes a caliper 14 which is slidably mounted via pin 16 on the vehicle 10, typically on a suspension component of the vehicle 10. Accordingly the caliper 14 can move in the direction of arrow A and in the direction of arrow B.

The vehicle 10 includes a brake rotor, in this case a brake disc 18 which is rotatably mounted about axis C. The brake disc 18 is rotatably fast with a wheel (not shown) which also rotates about axis C.

Brake pad 20 includes a brake pad back plate 20A and friction material 20B. Brake pad 22 includes a brake pad back plate 22A and friction material 22B.

The brake pads 20 and 22 are on opposite axial sides of the brake disc. Adjacent brake pad 22 is an adjuster mechanism 24. An actuation shaft (or operating shaft) 26 is mounted in the caliper 14 and is rotatable about axis D. A roller 28 is supported on the actuation shaft 26 and engages a right hand end (when viewing FIG. 1) of the adjuster mechanism 24.

Operating lever 30 is attached to the actuation shaft 26. An actuator 32 is mounted on the caliper 14, and includes an actuator rod 34 (only shown in FIG. 1), which engages an end 30A of the actuating lever 30.

The actuator 32 is a mechanically operated actuator, in this case an air operated actuator. The actuator 32 may not be an electrically operated actuator.

As shown in FIG. 1 the brakes are in a released condition, operating lever 30 having being rotated clockwise about axis D such that a gap G1 exists between brake pad 20 and brake disc 18 and a gap G2 exists between brake pad 22 and brake disc 18. Accordingly, the released running clearance is G1+G2.

In order to apply the brakes the actuator 32 is operated such that the actuator rod extends from the actuator and moves in a direction of arrow A thereby rotating the operating shaft 26 anti-clockwise about axis D. Because the roller 28 is offset from axis D, the roller 28 moves in the direction of arrow A which causes the adjustment mechanism 24 to move in a direction of A which forces the brake pad 22 in the direction of arrow A, thereby closing the gap G2. Continued anti-clockwise rotation of the operating shaft 26 then causes the caliper 14 to move in the direction of arrow B as the hole 17 in the caliper slides on pin 16. This causes gap G1 to close. At this point the instantaneous running clearance is zero but, because the brake pads are not being forced against the brake disc 18, no braking force exists to retard to slow the vehicle. Only when the actuator 32 continues to move the actuator rod 34 in the direction of arrow A, does a clamping force of the brake pads on the discs start to be generated. The clamping (or braking) force is dependent upon, amongst other things, the force in the actuating rod 34, a higher force actuating rod 34 resulting in a higher clamping force and therefore a higher retardation of the vehicle. As the force in actuator rod 34 increases, the elasticity in the various brake components allows for the actuator rod to continue to extend from the actuator and continue to move in the direction of arrow A relative to the actuator, in spite of the fact that the brake pads 20 and 22 are in engagement with the brake disc 18. By way of example, if the brake force is increased, the caliper 14 will start to deflect with the side 14a progressively moving further away from side 14b. Clearly other brake components will deflect as the brake force increases.

By way of example, if the released running clearance as shown in FIG. 1 is 1 mm (e.g. G1=0.5 mm and G2=0.5 mm) and the operating ratio of the operating shaft 26 is approximately 20:1, (i.e. every 20 mm end 30A moves in the direction of arrow A, roller 28 moves 1 mm in the direction of arrow A), then to reduce the instantaneous running clearance to zero requires end 30A to move 20 mm in the direction of arrow A. However, at this point the brakes are not applied. In order to apply the brake end 30A must continue to be moved in the direction of arrow A relative to the actuator 32 and, by way of example, for the brake to be applied relatively heavy, end 30A must extend a further 20 mm, i.e. a total of 40 mm. This 40 mm movement of end 30A causes a roller 28 to "move" total of 2 mm, 1 mm of which closes gaps G1 and G2 and the other 1 mm of which is absorbed in the elasticity of the various components.

The adjuster mechanism 24 is adjusted by electric motor 25. Thus the adjuster mechanism 24 can be extended (or lengthened) (such that end 24B moves away from end 24C) or retracted (or shortened) (such that end 24B moves towards end 24C) by operation of the electric motor 25. It will be appreciated that by extending the adjuster mechanism 24 the released running clearance will reduce and by retracting (or shortening) the adjuster mechanism 24 the released running clearance will increase.

As will be appreciated, the adjuster mechanism 24 is a distinct component from the actuator 32. The actuator 32 performs the function of applying and releasing the brake. The adjuster mechanism 24 performs the function of adjusting (in particular the running clearance) of the brake. The adjuster mechanism is not used to apply the brake. The actuator mechanism is not used to adjust the running clearance of the brake. The actuator 32 is an air operated actuator though other types of mechanical actuator may be used. The adjuster mechanism 24 is electrically operated, i.e. in order to adjust the adjuster mechanism the electric motor 25 must be operated.

The vehicle 10 includes a sensor 40 and a processor 42, in one embodiment a microprocessor (or microcontroller). There is also included a memory 46 such as data storage, such as flash memory.

The sensor 40 in this case is a position sensor and senses the position of the actuating lever 30.

FIG. 2 shows an exploded view of a brake assembly including an exploded view of a module 50. The module 50 includes a module housing 52, the electric motor 25, an output element 54 in the form of a gear and an electrical interface 56. The module also includes wiring 58, a planetary gear box 60, a first gear 62, a second gear 64, a printed circuit board (PCB) 66, seals 67 and 68, and fasteners 69, 70, 71, 72, 73, 74 and 75.

Motor 25 is generally cylindrical and has an output shaft 78 which rotates about axis E.

Planetary gear box 60 is generally cylindrical and has an input shaft 80 and an output shaft 81. Input shaft 80 and output shaft 81 both rotate about axis F, though at different speeds, as will be described below.

Figure 3:
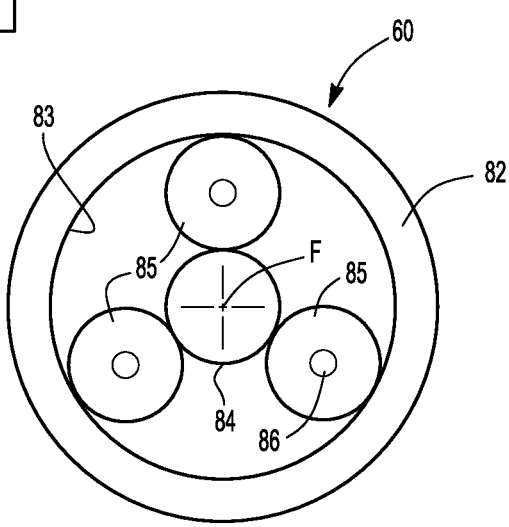
FIG. 3 shows a cross-section view of one of the components of FIG. 2.

Planet gear boxes are known and as such a detailed explanation is not required here. However, in summary with reference to FIG. 3 the planetary gear box 60 includes a casing 82 including a ring gear 83. In the middle of the ring gear there is a sun gear 84 which rotates about axis F. One or more planet gears (in this case three planet gears 85) are mounted on a planet carrier 86. Each planet gear meshes with the sun gear and the ring gear. The planet gears are maintained in a fixed circumferential relationship to each other by the planet carrier 86. The planet carrier rotates about axis F.

The sun gear is directly attached to and is driven by input shaft 80. The planet carrier is directly attached to and drives output shaft 81. The casing and ring gear are held rotationally stationary as will be further described below.

First gear 62 includes a central bore 62A and gear teeth 62B. Second gear 64 includes a central bore 64A and gear teeth 64B.

The module housing 52 comprises a body portion 90 defined by first part 91 and second part 92 and a cover 93. The first part 91 includes a recess 91A and the second part 92 includes the recess 92A. The second part includes a further recess 94, first fixing lugs 95 and second fixing lugs 96. The cover 93 includes fixing lugs 97.

The processor (for example a microcontroller) 42 and memory 46 are provided on the PCB. The PCB may also include a motor driver and also other components such as resistors etc.

The module is assembled as follows.

The wiring 58 is connected to the motor 25 and to the electrical interface 56 to form a sub assembly. Hence, the wiring 58 connects the motor 25 to the sensor 40 via the electrical connectors 41A and 75 (as 41A and 75 are mating connectors) and via wiring 41.

The electric motor is inserted into recess 92A of the second part and secured to the second part via fasteners 73, in this case six screws. The planetary gear box is inserted into recess 92A of second part 92 and the casing 82 of the gear box is secured thereto via fasteners 73 in this case four screws.

Seal 67 is positioned in place and the first part 91 is assembled onto the second part 92 so that the planetary gear box 60, motor 25, wiring 58, and part of electrical interface 56 are contained within recesses 91A and 92A. The first part 91 is secured to the second part via fasteners 74, in this case four screws which attach the first part 91 to the casing 82 of the planetary gear box 60. As will be appreciated since planetary gear box is attached to the second part 92 via fasteners 73, then the first part 91 is attached to the second part 92 via the planetary gear box casing. In this state an end 56A of electrical interface 56 passes through a hole (not shown) in first part 91. The fastener 75, in this case a nut, is then screwed on to end 56A of the electrical interface 56 to secure it in place relative to the first part 91.

As will be appreciated, output shaft 81 will be projecting through a hole (not shown) in the first part 91. The gear 54 can then be assembled onto the output shaft 81 and secured rotationally and axially fast by a suitable means.

As will be appreciated the seal 67 is sandwiched between the first part 91 and the second part 92 and therefore recesses 91A and 92A are sealed.

As will be appreciated, output shaft 78 will be projecting through a hole (not shown) in the second part 92 and hence projects into the further recess 94. The first gear 62 can be assembled onto the shaft 78 by passing the bore 62A over the shaft 78 and securing in place via fastener 71, in this case a screw.

Similarly, the input shaft 80 will be projecting through a hole in the second part and hence projects into the further recess 94. The second gear 64 can be assembled onto the input shaft 80 by passing bore 64A over shaft 80 and securing in place by fastener 71, in this case a screw. Once the first gear 62 and second gear 64 are assembled as described above into the further recess 94 the teeth 62B and 64B will be in meshing engagement with each other.

The PCB and associated electrical components define an integrated electronic unit 65 which can be secured inside the cover via fasteners 70, in this case screws.

The seal 68 can then be positioned in place and the cover together with the integrated electronic unit can be assembled onto the second part 92 via fixings 69 (in this case screws) passing through holes in fixing lugs 97 and screwing into fixing lugs 95 as appropriate.

The seal 68 is therefore sandwiched between the cover 93 and the second part 92 and hence the further recess 94 is sealed.

Advantageously, the module forms a sub assembly which can be manufactured separately from the brake 12. The module can be shipped, as a preassembled unit to a brake assembly line and assembled into brakes. Thus, the caliper 14 includes a recess 47 which receives the module 50. An opening of the recess is generally oval and substantially matches the oval shape of the right hand part (when viewing FIG. 2) of the first part 91 and the left hand part (when viewing FIG. 2) of the second part 92. The caliper 14 includes three fixing holes 48. The module is inserted into recess 47 until such time as the second fixing lugs 96 abut the opening of recess 47 adjacent fixing holes 48. Once in this position fasteners 72, in this case screws, can be passed through holes in the fixing lugs 97 and into fixing holes 48 thereby securing the module to the caliper. As will be appreciated, the second part 92 includes a flange 98 formed between oval portion 99A of the second part and rectilinear portion 99B of the second part. This flange 98 seals against adjacent portion of the caliper housing.

As described above, the caliper includes sensor 40, which in this case is a rotary encoder (see FIG. 2). Rotary encoder includes wiring 41 which has an electrical interface 41A. In this case electrical interface 41A is a plug and electrical interface 56 is a socket.

Prior to assembling the module onto the caliper, the sensor 40, wiring 41 and electrical interface 41A will have been secured in place in the caliper. Thus, the act of inserting the module into the caliper also acts to make the electrical connection between the plug and socket.

The adjuster mechanism 24 includes a gear 24A (see FIG. 1).

Typically, prior to assembling the module into the housing of the caliper the adjuster mechanism 24 and gear 24A will be installed in the caliper. Thus, the act of inserting the module into the caliper recess 47 also acts to mesh the gear 54 with the adjuster mechanism gear 24A.

As described above, the flange 98 seals against the housing. Thus the act of inserting the module into the housing also causes sealing of the module against the housing.

As will be appreciated, brake calipers operate in a harsh environment with high temperatures being created by the braking action of brake pads against brake rotors. Furthermore, the environment may be dirty due to road dirt, mud and the like. Additionally the environment may be wet, due to rain and water or the like being splashed up by the associated wheels. Accordingly, brake calipers and components on the brake calipers operate in a harsh environment. The present invention provides a module which includes a number of components. The components contained within the module are protected from the environment by the module housing 52. In the event of failure of any of the components of the module, it is an easy maintenance task to remove the whole module and replace it with a new module. As such the service time is minimised and therefore down time of an associated vehicle is minimised. In this case in order to remove the module only three screws associated with three fixing holes 48 need be removed and then the module can be withdrawn. The act of withdrawing the module disengages gear 54 from the adjuster mechanism gear and also disengages plug 41A from socket 56. Accordingly, no separate action is required by the maintenance engineer to either disengage the gear 54 or disconnect the plug and socket. Similarly when a new module is replaced the act of replacing the module simultaneously meshes the new gear 54 with the adjuster mechanism gear, engages the new plug 41 with the socket 56 and seals the new flange 98 against the housing. Accordingly, no separate action is required by the maintenance engineer to achieve this result.

Operation of the brake is as follows:

The module operates to adjust the adjuster mechanism 24 to alter the running clearance gaps G1 and G2. For example when the brake friction material 20B and 22B wears due to use gap G1 and G2 will increase and the motor will adjust the adjuster mechanism so as to lengthen the adjuster mechanism, thereby reducing gaps G1 and G2. In order to adjust the length of the adjuster mechanism 24 the motor is powered so as to rotate output shaft 78 through a desired angle. Rotation of output shaft 78 causes a similar rotation of first gear 62 which in turn causes rotation of gear 64. However, since gear 62 has a smaller diameter than gear 64, then gear 64 will rotate more slowly than gear 62. The size of gear 62 and 64 is such that there is a speed reduction between gear 62 and gear 64.

Rotation of second gear 64 will cause rotation of the input shaft 80 of the planetary gear box. As described above input shaft 80 is connected to the sun gear 84. As the sun gear 84 rotates, and since the ring gear 83 is held stationary, then the planet gears 85 will cause planet carrier to rotate, though at a slower speed than the sun gear. Since the output shaft 81 is connected to the planet carrier the output shaft 81 rotates at a slower speed than the input shaft 80. In one example the speed ration between the input shaft 80 and the output shaft 81 is 23:1, i.e. for 23 complete rotations of the input shaft 80 the output shaft 81 will rotate through one complete rotation. Since the output shaft 81 is connected to the gear 54, gear 54 will rotate at the same speed as the output shaft 81. Rotation of gear 54 causes rotation of gear 24A and hence the adjuster mechanism 24 is caused to adjust in length.

Purely by way of example, the system controlling the adjuster may detect an adjustment is required. That adjustment may require, for example, 10 degrees of rotation of the output gear 54. In order to rotate the output element 54 by 10 degrees, and assuming the planet gear box ratio is 23:1 then shaft 80 must be rotated 230 degrees. In order to rotate the shaft 80 by 230 degrees and assuming the gear ratio between gears 62 and 64 is 2:1 then the motor must be rotated 460 degrees. Note that the 10 degree angle mentioned above through which gear 54 need be turned is purely exemplary. Under other circumstances the gear may need to be turned more than 10 degrees or less than 10 degrees. Note that the ratio of the epicyclic gear box 60 mentioned above is purely exemplary in further embodiments the epicyclic ratio may be greater or less than 23:1. Note that the ratio between first gear 62 and second gear 64 mentioned above is purely exemplary in further embodiments the ratio may be greater than or less than 2:1.

Note that in the example above motor 25 rotates through 460 degrees to effect an adjustment of adjuster mechanism 24. In further embodiments motor 25 could increment through any angle in order to adjust adjuster mechanism 24. In particular any angle greater than 460 degrees and also any angle less than 460 degrees. In particular in order to adjust adjuster mechanism 24 motor 25 could increment through any angle less than the complete turn, i.e. any angle less than 360 degrees. Alternatively, motor 25 could increment through any angle greater than a complete turn, i.e. any angle greater than 360 degrees.

The motor is controlled by processor 42. Processor 42 is connected via wiring 58 to the sensor 40. The processor 42 and sensor 40 operate as described in the applicant's copending European patent application, publication number EP2650556, the contents of which are hereby incorporated by reference.

However, in summary, sensor 40 in conjunction with processor 42 are able to detect the amount of movement required by actuating lever 30 to move from the rest position as shown in FIG. 1 to a position where the gaps G1 and G2 have just closed, i.e. where the instantaneous running clearance is zero. The movement of the actuating lever 30 can then be compared with a predetermined movement and if the movement of the actuating lever 30 is excessive then this indicates an adjustment of the adjuster mechanism 24 is required. Accordingly, the processor 42 can issue a signal instructing rotation of motor 25 by a predetermined amount thereby causing a predetermined amount of adjustment of the adjuster mechanism 24.

The brake 12 may include a further connection (not shown) to the electrical system of the vehicle thereby providing power, for example to operate the motor 25 etc.

In this case the module housing 52 includes wiring 58, motor 25, planetary gear box 60, first gear 62, second gear 64 and PCB 66. PCB 66 includes memory 46 and processor 42. In further embodiments not all these components are required to be contained in the module housing 52.

In further embodiments the module housing 52 may include a first electrical interface separate from a second electrical interface. For example, in a further embodiment the housing may include a first electrical interface positioned similarly to electrical interface 56 and coupling with wiring of a sensor and the housing may include a second electrical interface provided elsewhere on the module housing, in one example provided on a separate part of the module housing, for example provided on second part 92 or on cover 93.

As will be appreciated, the electrical interface 56 is received within the recess 47 of the brake housing. In further embodiments further electrical interfaces may be received within brake housing. In further embodiments further electrical interfaces may be mounted externally of the brake housing on the module housing, for example a further electrical interface may be mounted on a cover which, when the module is assembled onto the caliper the cover will be positioned externally on the brake housing and hence electrical interface mounted on the cover will be mounted externally on the brake housing.

Note that, in further embodiments the module can be controlled other than by the system shown in European application publication number EP2650556. In particular, a control system which operates the electric motor need not be contained within the module housing, in particular such a control system can be positioned elsewhere on the vehicle, in particular in a less harsh environment. Such an arrangement would therefore require wiring to connect the control system to the electric motor and typically such wiring might include electrical interface to connect to the module housing, for example by plug and socket arrangement on the cover or the like.

As will be appreciated from FIG. 2, the integrated electronic unit 65 is positioned remotely from the brake disc and friction pads. Therefore, it tends to remain cooler than other parts of the brake closer to the brake disc and friction pads. As will be appreciated the first and second gears are positioned between the integrated electronic unit 65 and the output element 54. Similarly, the planetary gear box 60 is positioned between the integrated electronic unit 65 and the output element 54. The integrated electronic unit 65 is at least partially received in a recess of the cover 93. As mentioned above, the cover 93 is mounted externally of the recess 47. Since at least a part of the integrated electronic unit 65 is positioned within the recess in the cover 93, then at least a part of the integrated electronic unit 65 is mounted externally relative to the recess 47.

In further embodiments the integrated electronic unit 65 may include a CAN transmitter in order to connect to and communicate with other electronic units of the vehicle, for example to provide warnings and/or diagnostic information. In a further embodiment the integrated electronic unit may include a CAN reader, in order to connect with and communicate with other electronic units of the vehicle. Such a CAN reader may receive information and effect adjustment of the brake.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
   a brake housing;
   an adjuster mechanism received within the brake housing; and
   a module that is at least partially received in the brake housing and is operable to adjust the adjuster mechanism, the module including:
      a module housing that is at least partially received in the brake housing;
      an electric motor that is enclosed within the module housing, wherein the electric motor is rotatable about a first axis and drives a first gear that is rotatable about the first axis, the first gear being in meshing engagement with a second gear that is rotatable about a second axis that differs from the first axis, wherein the first and second gears are contained within the module housing and the first gear rotates faster than the second gear;
      a shaft that is at least partially received in the module housing and that is rotatable about the second axis;
      an output element that is mounted on the shaft externally of the module housing, the output element being operably coupled to the electric motor;
      an electrical interface for electrically coupling the electric motor to one or more components mounted externally of the module housing; and
      an integrated electronic unit that is enclosed in the module housing, the integrated electronic unit including one or more of a PCB, a processor, memory, a motor driver, a CAN transmitter, and a CAN reader;
   wherein the output element is operably coupled to the electric motor by a planetary gear box having a sun gear, at least one planet gear, and a ring gear, wherein an axis of rotation of the sun gear is coincident with the second ax is, the sun gear rotates at a same speed as the second gear when the module is in use, and wherein the at least one planet gear is mounted on a planet carrier and, in use, the planet carrier rotates at a same speed as the output element;
   wherein the module housing includes a body and a cover that closes an opening of the body, wherein the planetary gear box is enclosed within the body, wherein the body is a two-part body, and wherein the first and second gears are positioned in a cavity defined between the body and the cover;
   wherein the output element is positioned on a first side of the first and second gears and the integrated electronic unit is positioned on a second side of the first and second gears opposite the first side;
   wherein the output element is positioned on a first side of the planetary gear box and the integrated electronic unit is positioned on a second side of the planetary gear box opposite the first side; and
   wherein the integrated electronic unit is at least partially received in a recess of the cover.

2. A brake assembly comprising:
   a brake housing;
   an adjuster mechanism received within the brake housing; and
   a module that is at least partially received in the brake housing and is operable to adjust the adjuster mechanism, the module including:
      a module housing that is at least partially received in the brake housing;
      an electric motor that is enclosed within the module housing, wherein the electric motor is rotatable about a first axis and drives a first gear that is rotatable about the first axis, the first gear being in meshing engagement with a second gear that is rotatable about a second axis that differs from the first axis, wherein the first and second gears are contained within the module housing and the first gear rotates faster than the second gear;
      a shaft that is at least partially received in the module housing and that is rotatable about the second axis;

an output element that is mounted on the shaft externally of the module housing, the output element being operably coupled to the electric motor;

an electrical interface for electrically coupling the electric motor to one or more components mounted externally of the module housing; and an integrated electronic unit that is enclosed in the module housing, the integrated electronic unit including one or more of a PCB, a processor, memory, a motor driver, a CAN transmitter, and a CAN reader;

wherein the output element is received within the brake housing, and wherein the electrical interface is received within the brake housing; and wherein the electrical interface includes a first electrical connector and a second electrical connector distinct from the first electrical connector, wherein the module housing is a sealed housing, wherein the module housing includes a body and a cover that closes an opening of the body and the electric motor is enclosed within the body and wherein the first electrical connection is received within the brake housing and the second electrical connector is mounted externally of the brake housing, and the brake assembly includes a sensor received within the brake housing and being electrically coupled to the first electrical connector.

3. The brake assembly of claim 2 wherein the module housing is sealed, to the brake housing and, the brake housing includes an aperture that receives at least a part of the module housing, an edge of the aperture being sealed to an adjacent part of the module housing, wherein the adjacent part of the module housing is defined by the body, wherein the body is directly secured to the brake housing.

4. The brake assembly of claim 1 wherein the output element and the electrical interface are received within the brake housing.

5. The brake assembly of claim 4 wherein the electrical interface includes a first electrical connector and a second electrical connector distinct from the first electrical connector, wherein the module housing is a sealed housing, wherein the electric motor is enclosed within the body and wherein the first electrical connection is received within the brake housing and the second electrical connector is mounted externally of the brake housing, and the brake assembly includes a sensor received within the brake housing and being electrically coupled to the first electrical connector.

6. The brake assembly of claim 1 wherein the electrical interface includes a first electrical connector and a second electrical connector distinct from the first electrical connector, wherein the module housing is a sealed housing, the electric motor is enclosed within the body, the cover is mounted externally relative to the brake housing, and the cover is sealed to the body.

7. The brake assembly of claim 1 wherein at least a part of the integrated electronic unit is mounted externally relative to the brake housing.

8. The brake assembly of claim 1 wherein the electric motor is spaced apart from and does not engage the brake housing.

9. The brake assembly of claim 2 wherein the output element is operably coupled to the electric motor by a planetary gear box having a sun gear, at least one planet gear, and a ring gear, wherein an axis of rotation of the sun gear is coincident with the second axis, the sun gear rotates at a same speed as the second gear when the module is in use, and wherein the at least one planet gear is mounted on a planet carrier and, in use, the planet carrier rotates at a same speed as the output element.

10. The brake assembly of claim 2 wherein the cover is mounted externally relative to the brake housing and the cover is sealed to the body.

11. The brake assembly of claim 2 wherein at least a part of the integrated electronic unit is mounted externally relative to the brake housing.

12. The brake assembly of claim 2 wherein the electric motor is spaced apart from and does not engage the brake housing.

* * * * *

UNITED STATES PATENT AND TRADEMARK OFFICE
CERTIFICATE OF CORRECTION

PATENT NO. : 10,527,117 B2
APPLICATION NO. : 14/853101
DATED : January 7, 2020
INVENTOR(S) : Prashant Narula et al.

It is certified that error appears in the above-identified patent and that said Letters Patent is hereby corrected as shown below:

In the Claims

Column 10, Lines 26-27, Claim 1:
After "is coincident with the second"
Delete "ax is" and
Insert -- axis --.

Signed and Sealed this
Seventh Day of April, 2020

Andrei Iancu
*Director of the United States Patent and Trademark Office*